No. 651,134.  
J. DICKENS.  
SWIVEL CONNECTION.  
(Application filed Jan. 19, 1900.)
Patented June 5, 1900.
(No Model.)
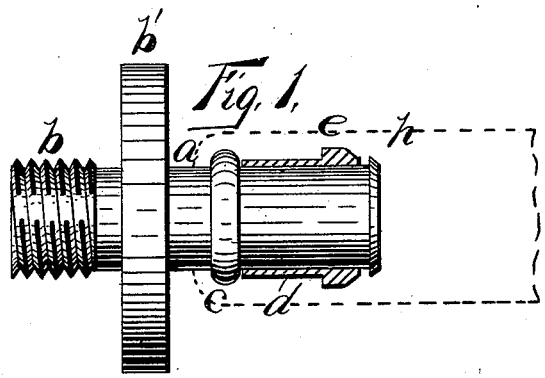
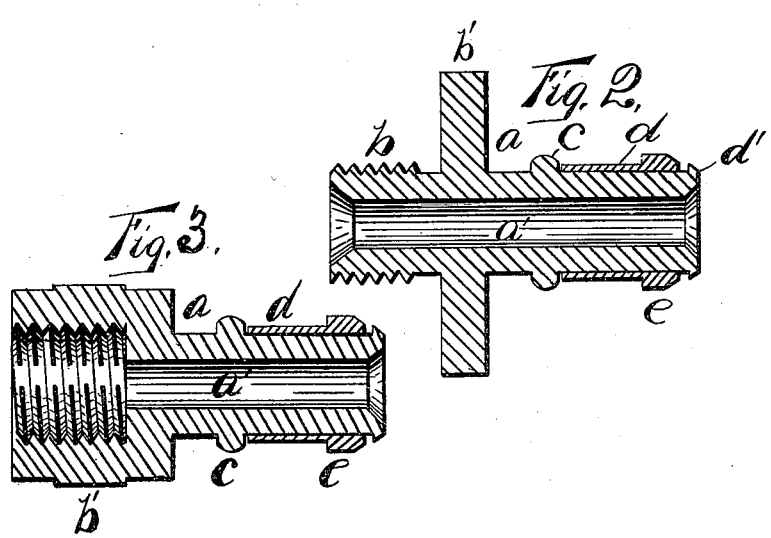
WITNESSES:  
C. C. Schoeneck  
M. M. Nott
INVENTOR  
John Dickens  
BY  
Smith & Denison  
ATTORNEYS.

UNITED STATES PATENT OFFICE.

JOHN DICKENS, OF NEW BRUNSWICK, NEW JERSEY.

SWIVEL CONNECTION.

SPECIFICATION forming part of Letters Patent No. 651,134, dated June 5, 1900.

Application filed January 19, 1900. Serial No. 2,022. (No model.)

*To all whom it may concern:*

Be it known that I, JOHN DICKENS, of New Brunswick, in the county of Middlesex, in the State of New Jersey, have invented new and useful Improvements in Swivel Connections, of which the following, taken in connection with the accompanying drawings, is a full, clear, and exact description.

This invention relates to swivel connections or devices for connecting an air-pipe of a pneumatic pump to the valve-nipple of a pneumatic tire.

My object is to improve upon the construction of the swivel connection set forth in the patent granted to F. N. Stevens, under date of September 21, 1897, No. 590,532. The difficulty with the swivel illustrated in that patent is that the pressure in the pneumatic tire forces the air out between the body and the nut, thereby causing it to leak under pressure.

My object is to so construct a connection which shall absolutely prevent leakage; and to that end my invention consists in the several new and novel features of construction and operation which are hereinafter described, and more specifically set forth in the claims hereunto annexed.

It is constructed as follows, reference being had to the accompanying drawings, in which—

Figure 1 is a side view of the connection complete, showing the rubber hose of the pump in dotted lines except that the sleeve is in section. Fig. 2 is a section, the hose being removed. Fig. 3 is a section of a modified form, showing one end of the central opening enlarged and threaded.

$a$ is the body of the swivel connection, having a central opening $a'$ and threaded at one end, as shown at $b$, and provided with a finger-disk $b'$, by which it is rotated. It is also provided with a bead $c$, and $d$ is a sleeve mounted upon the opposite end of the body and secured there by turning up an annular flange $d'$ on the end of the body $a$. The sleeve $d$ is provided with a bead upon its outer end $e$.

$h$ is the rubber hose, which is inserted over the sleeve sufficiently to cover the bead $c$, so that when force is put into the pump there will be no possibility of the air escaping under the sleeve. The sleeve $d$ engages with the hose and rotates with it; but the bead $c$ rotates in the hose. The sleeve receives most of the pressure from the hose and releases the bead $c$ from most of the friction.

In Fig. 3 I show a somewhat-modified form of construction, the central opening being enlarged at one end and threaded for use upon wheels of a foreign make. In this construction I provide the sleeve $d$ with a bead $f$, and $g$ is a leather packing-ring interposed between the end of the thumb-piece $b'$ and the bead upon the sleeve.

Having described my invention, what I claim, and desire to secure by Letters Patent, is—

1. A swivel connection comprising a body having a central opening threaded at one end and provided with a thumb-piece, a rotating sleeve mounted upon the opposite end, a bead secured upon the body, and an upturned flange for limiting the longitudinal movement of the sleeve, as set forth.

2. A swivel connection comprising a body enlarged at one end and having a central opening also enlarged at one end, said enlarged opening being threaded interiorly, a sleeve having beads upon each end rotatingly secured to the opposite end of the body, and a washer of leather or similar flexible material interposed between the enlarged end of the body and the bead upon the sleeve.

In witness whereof I have hereunto set my hand this 3d day of January, 1900.

JOHN DICKENS.

Witnesses:
 JOHN D. MARTIN,
 CHAS. TOURNEY.